United States Patent
Spector (10) Patent No.: US 8,472,866 B1
(45) Date of Patent: Jun. 25, 2013

(54) THEMED ORNAMENTS WITH INTERNET RADIO RECEIVER

(76) Inventor: Donald Spector, New York, NY (US)

(*) Notice: Subject to any disclaimer, the term of this patent is extended or adjusted under 35 U.S.C. 154(b) by 27 days.

(21) Appl. No.: 13/270,334

(22) Filed: Oct. 11, 2011

Related U.S. Application Data (63) Continuation-in-part of application No. 12/180,901, filed on Jul. 28, 2008, now Pat. No. 8,099,039.

(60) Provisional application No. 60/954,879, filed on Aug. 9, 2007.

(51) Int. Cl.
*H04H 40/00* (2008.01)
*H05K 11/00* (2006.01)

(52) U.S. Cl.
USPC .......................... 455/3.06; 455/90.3; 455/344

(58) Field of Classification Search
USPC ................... 455/3.01, 3.06, 39, 550.1, 575.1, 455/575.8, 90.2, 90.3, 344, 347
See application file for complete search history.

(56) References Cited

U.S. PATENT DOCUMENTS

| | | | |
|---|---|---|---|
| 7,065,342 B1 | 6/2006 | Rolf | |
| 7,817,591 B2 | 10/2010 | Cooley | |
| 7,873,040 B2 | 1/2011 | Karlsgodt | |
| 2004/0198175 A1 | 10/2004 | Shively et al. | |
| 2006/0168097 A1 | 7/2006 | Pittelli | |
| 2008/0188310 A1* | 8/2008 | Murdock | 463/42 |

* cited by examiner

*Primary Examiner* — Sonny Trinh
(74) *Attorney, Agent, or Firm* — Collard & Roe, P.C.

(57) ABSTRACT

Apparatuses for playing signals received from the Internet or other information highway on one or more speakers are described. The apparatus has a receiver for receiving information from a preselected address; a processor for interpreting the signals; and at least one sound emitting device for playing the processed signal. The apparatus has an ornamental design on the outside which is related to the topic of the signals received from the address. The apparatus could include a smartphone as the receiver.

3 Claims, 6 Drawing Sheets

THEMED ORNAMENTS WITH INTERNET RADIO RECEIVER

STATEMENT OF RELATED CASES

This application is a continuation-in-part under 35 USC §120 of U.S. patent application Ser. No. 12/180,901 filed Jul. 28, 2008, which claims the benefit of priority under 35 U.S.C. §119(e) to U.S. Provisional Patent Application Ser. No. 60/954,879, filed Aug. 9, 2007, the entirety of which is hereby incorporated by reference.

BACKGROUND OF THE INVENTION

This application relates to the field of internet receivers that are capable of receiving Internet radio signals. More specifically, this application relates to themed ornamental designs that relate to a specific station that is received through these devices by Wi-Fi or Wi-Max. It is also noted that one Wi-Fi or Wi-Max Internet receiver may be used to supply signal to multiple ornamental devices, thereby bringing down the cost of a specific ornament in the future. The Internet receiver can be incorporated into a mobile telephone. The ornament can be part of the mobile telephone or can be a separate item, such as a docking station or a case.

Internet Radio Stations are easy to broadcast and with Wi-Fi and Wi-Max can be transmitted to virtually every part of the world. In fact, the problem is that so many stations are available on the Internet that it is hard for them to get traction. It is hard for those stations to get traffic even when they have been "selected" for AOL Radio or another "brand" name. Therefore, there is a need in the art for an Internet Radio player which can help an Internet Radio Station gain market share.

SUMMARY OF THE INVENTION

The present invention relates to Internet Radio receivers having an ornamental design that is related to a topic. The ornamental design may be of any number of topics. By way of example, the ornamental design may be the Vatican, Magic Kingdom, Yankee Stadium or even a more generic figure (such as Santa Claus). In accordance with one or more embodiment, these "radios" are capable of picking up multiple Internet Radio stations. In detailed embodiments, the radio would refer back to an Internet Station that was serviced by the Vatican, Disney or a company that promoted Christmas Music, for example. In another embodiment, the ornament is a docking station for a mobile telephone. The docking station receives the mobile telephone, which has an application that can play an internet radio station. In one version of this embodiment, the docking station causes the mobile telephone to play the radio station that correlates with the theme of the docking station. The ornament could also be a cover or accessory for a mobile telephone.

In another embodiment, the ornament is a display on a screen of a mobile telephone. The mobile telephone user selects an application ("app") related to the internet radio station and the mobile telephone then plays the radio station and displays a graphic related to the radio station.

In another embodiment the ornament is separate from the mobile telephone, but is connected wirelessly to the mobile telephone and can play audio and video signals received by the mobile telephone.

When the device is turned on, it may be programmed to automatically broadcast events related to the product it represents. The ornament could relate to a well known actor, sports figure or other personality as well as a location. These physical objects help the Internet Station get traction and thereby help increase the number of listeners. Furthermore, because they are "displayed" as either toys or artwork (like ceramic pieces) they tend to come to the mind of the consumer more and therefore their initial cost could be subsidized by those who sold advertising on the Internet Station and want to reach a very specific demographic.

One or more embodiments of the invention are directed to apparatus for playing signals received from the internet or other information highway on one or more speakers or sound emitting devices. The apparatus can comprise a receiver that connects to the internet or other information highway. A processor is included in the receiver that connects to an address on the internet or other information highway. A connection to which the one or more speakers or sound emitting devices can be connected to play signals received from the preselected address on the internet or other information highway is provided. The outside of the apparatus has an ornamental design related to the topic of the signals received from the address on the internet or other information highway. In detailed embodiments, the address may be pre-programmed into the apparatus.

The receiver is wirelessly connected to the Internet or other information highway, using Wi-Fi or Wi-Max technology. Any connection to the internet, however, can be used.

The receiver has a processor that connects to one of a plurality of preselected addresses on the internet or other information highway. The apparatus also has an interface for selecting the one of the plurality of preselected addresses. Another aspect has a plurality of ornamental designs on the apparatus. Each of the ornamental designs may be related to a topic on each of the plurality of preselected addresses. For example, on a mobile telephone with Internet capability, the mobile telephone could have a plurality of applications relates to internet radio stations installed on it. Selecting one of the applications causes the mobile telephone to display a graphic related to the selected radio station, so that the mobile telephone itself becomes the ornament.

The ornamental design of some embodiments may represent any known entity, place, thing, etc. For example, it can be selected from the group consisting of: a theme park attraction, a sports stadium, and a religious site. The ornamental design of the apparatus may be a representation of an edifice, a character, a piece of art or other similar representation. According to some aspects, the apparatus may default to an internet radio station which is correlated with the ornamental design when power is supplied to the apparatus.

In other aspects, the speakers may be physically connected to the apparatus or wirelessly to the wireless connection.

Further aspects of the invention have a preselected address on the internet which transmits signals related to a preselected topic. The topic can be, for example, religious, sports related or educational in nature.

DETAILED DESCRIPTION

As used in this specification and the appended claims, the singular forms "a", "an" and "the" include plural referents unless the context clearly indicates otherwise. Thus, for example, reference to "a radio" includes a combination of two or more radios, and the like.

As used in this specification and the appended claims, "internet" refers not only to the internet, but also to any wide area network or local area network. Use of the term "internet" is not intended to limit the present invention to communications received via the world wide web.

As used in this specification and the appended claims, "pre-selected" means that the internet radio address, or URL, has been programmed into the radio. The pre-selected address may be a default address, or a selection of addresses to which the user can set the radio to default.

As used in this specification and the appended claims, a "speaker" means any sound emitting device and is not limited to standard electromechanical transducer type speakers. Non-limiting examples of suitable speakers are piezoelectric speakers, electrostatic speakers, flat panel speakers and digital speakers.

As used in the specification and the appended claims, a "smartphone" is a mobile telephone equipped with internet capability.

As used in the specification and the appended claims, an "application" or "app" is a software program installed on a smartphone, which can perform certain functions directly or is used to directly connect the smartphone to an internet-based program via a link on the display screen of the smartphone.

Figure 1:
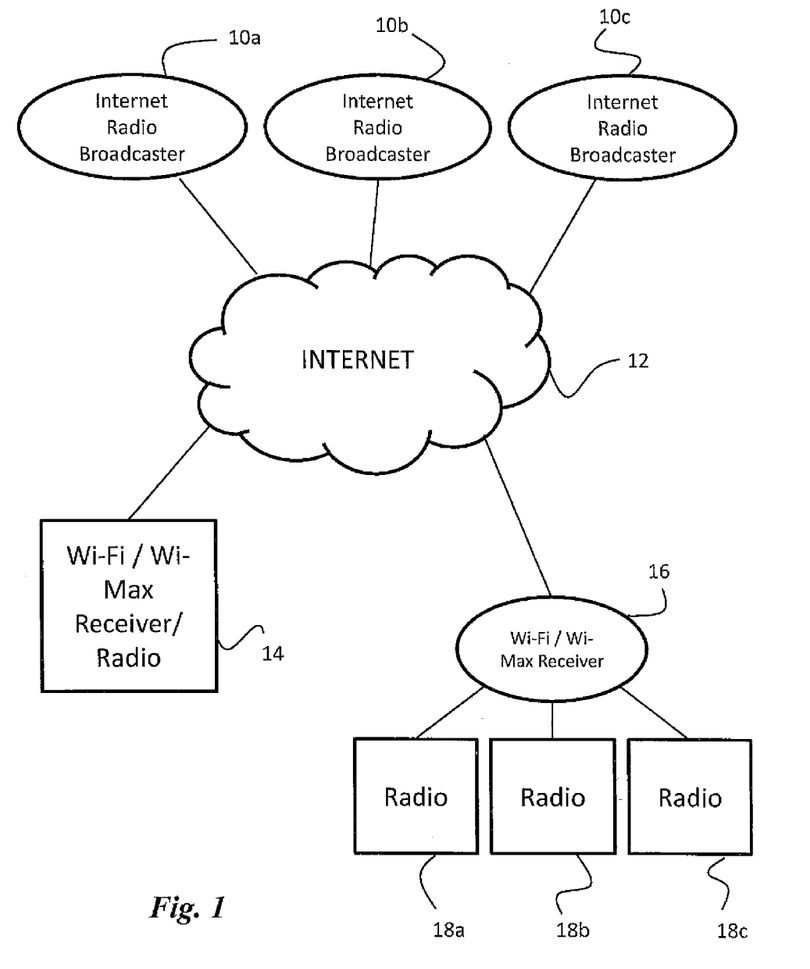
FIG. 1 illustrates a block diagram of an Internet Radio broadcast receiving station.

Referring to FIG. 1, one or more Internet Radio Broadcasters 10*a*, 10*b* and 10*e*, provide electronic signals through the internet 12. The signals can be received by a combination Wi-Fi/Wi-Max receiver/radio 14 or individual receivers 16. If an individual receiver is employed, at least one separate radio 18*a*, 18*b* and 18*c* would be needed to provide audio output.

The signal must be interpreted before it can be played on the radio. This interpretation can be performed by either the receiver or the radio depending on the desired configuration. For example, the receiver 16 may be placed in an office building. The receiver 16 may interpret the electronic signals, generating signals that can be played directly by the radio 18. This would allow a plurality of radios to be placed around the office building which would all play the same received signal.

The Internet Radio Broadcaster could also be a local broadcast which might be transmitted as a signal containing, for example, elevator music. The signal could be transmitted to a network with limited receivership. For example, an in-house radio station could transmit over a local area network which can only be received and interpreted by devices connected to that local area network.

Accordingly, one or more embodiments of the invention are directed to apparatuses for playing signals received from the internet or other information highway on one or more speakers. The apparatus comprises a receiver that connects to the internet or other information highway. A processor is included in the receiver that connects to a preselected address on the internet or other information highway. A connection to which the one or more speakers can be connected to play signals received from the preselected address on the internet or other information highway. The outside of the receiver has an ornamental design related to the topic of the signals received from the preselected address on the internet or other information highway.

Some aspects of the invention wirelessly connect the receiver to the internet or other information highway. Other aspects have suitable apparatus to connect the receiver to the internet or other information highway using Wi-Fi or Wi-Max technology.

Detailed embodiments of the invention have a processor that connects to one of a plurality of preselected addresses on the internet or other information highway. The apparatus also has an interface for selecting the one of the plurality of preselected addresses. Another aspect has a plurality of ornamental designs on the apparatus. Each of the ornamental designs may be related to a topic on each of the plurality of preselected addresses.

The ornamental design of some embodiments may be selected from the group consisting of a theme park attraction; a sports stadium, and a religious site. The ornamental design of the apparatus may be a representation of an edifice, a character, a piece of art or other similar representation. According to some aspects, the apparatus may default to an internet radio station which is correlated with the ornamental design when power is supplied to the apparatus.

In other aspects, the speakers may be physically connected to the apparatus or wirelessly to the wireless connection.

Further aspects of the invention have a preselected address on the internet which transmits signals related to a preselected topic. The topic can be, for example, religious, sports related or educational in nature.

Figure 2:
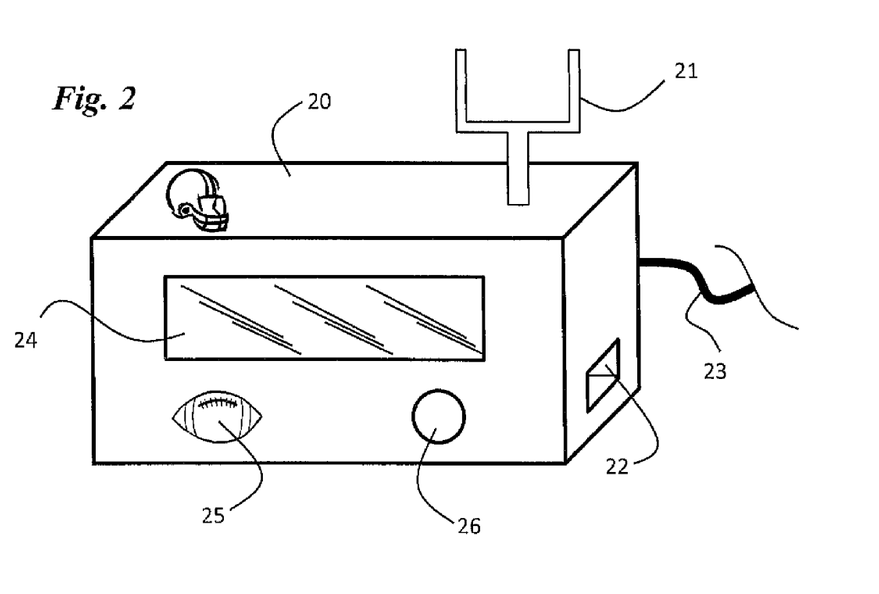
FIG. 2 illustrates an Internet Radio in accordance with one aspect of the present invention.

FIG. 2 shows a radio 20 according to one or more embodiments of the invention. The radio 20 shown has an ornamental design related to football. The user can supply power to the radio be either connection of a power cord 23 to a standard power outlet or by battery power (not shown). Any buttons and dials on the radio can be shaped in accordance with the ornamental design. For example, the user may power the radio 20 by pressing a power button 25, shown as a football shaped button.

The radio 20 may be, but does not need to be, preprogrammed with a specific internet radio station which will act as a default station related to the ornamental design. Here, the radio 20 may tune to an Internet radio station associated with the National Football League, or a station that broadcast college football games. The user may be able to connect the radio 20 to a computer (not shown) to add additional internet radio stations. Alternatively, the radio 20 may have buttons or controls (not shown) to allow additional internet radio station URLs to be added.

Once powered, the radio 20 might be designed to broadcast the default internet radio station. The radio 20 can access the internet wirelessly using a wireless antenna 21, which can be shaped according to the ornamental design. Additionally, the radio 20 can be connected to the internet through a wired connection 22 using, for example, an Ethernet connection to a computer or an internet appliance, USB, IEEE-1394, serial, parallel, or any other suitable connection.

The radio 20 has a screen 24 which can display information related to the internet radio station that is being broadcast. For example, the URL, name of the radio station, or song/program specific information can be displayed. The display 24 may not be needed if the radio is locked into a specific internet radio station. The user may tune the station by turning or pressing a tuning dial 26, shown as a normal dial but could also be ornamental in accordance with the overall design.

Figure 3:
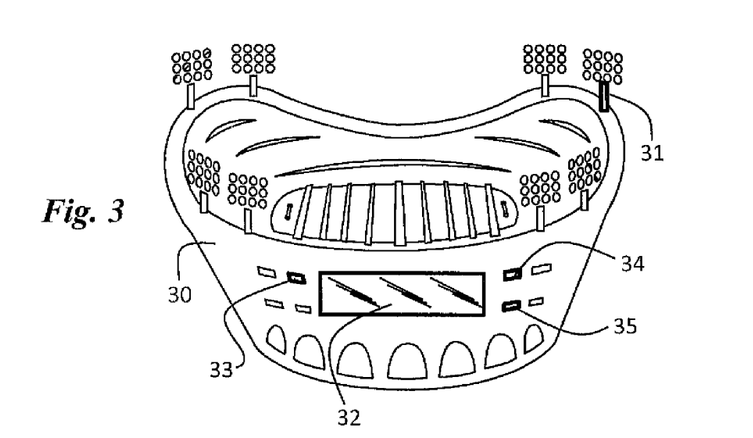
FIG. 3 illustrates another aspect of the Internet Radio in accordance with the present invention.

FIG. 3 shows a radio 30 according to other embodiments of the invention. Here, the radio 30 has the physical shape of a sports arena. A wireless antenna 31 is incorporated into the design as part of the sports arena lighting. The display 32, if needed, can also be incorporated into the design, here as windows on the arena. The display 32 could alternatively be shaped and located as a scoreboard within the arena. The power button 33 and tuning buttons 34, 35 can also be incorporated as components of the ornamental design. Upon powering the radio 30 using the power button 33, the radio 30 would default to a station associated with the ornamental design. Here, it may tune to a sports station. The station may be changeable by pressing the tuning buttons 34, 35 to select a number of pre-programmed radio stations. The radio 30 may also be connectable to a computer through any suitable connection (not shown) allowing the user to program additional stations into the radio 30.

Figure 4:
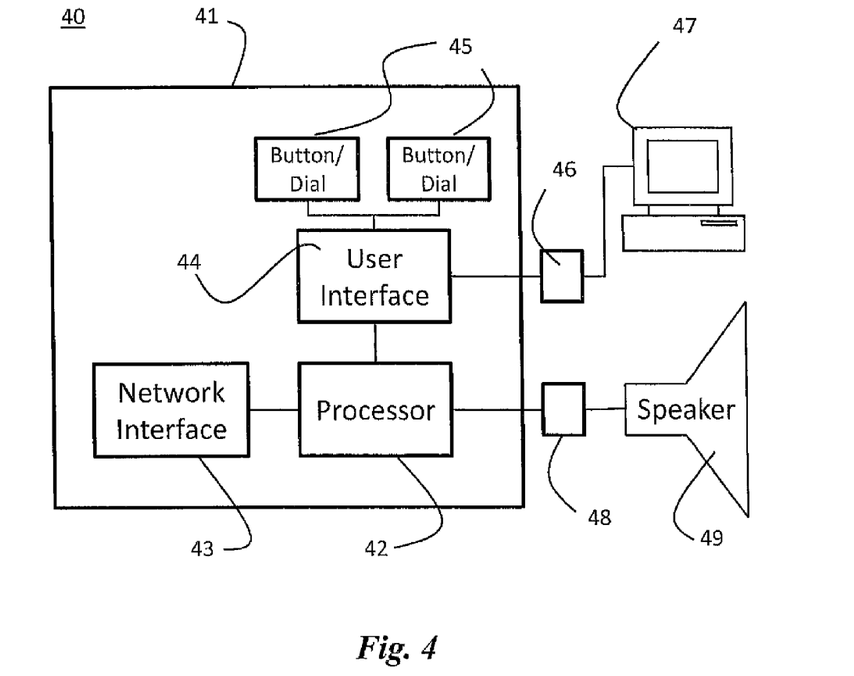
FIG. 4 illustrates a block diagram schematic of an Internet Radio.

FIG. 4 shows a block diagram schematic of an internet radio 40 according to one or more embodiments of the invention. The housing 41 containing the internet radio components can have an ornamental design. A processor 42 contained within the housing 41 is coupled to a network interface 43. The network interface 43 can be a wireless connection or a wired connection.

Figure 9:
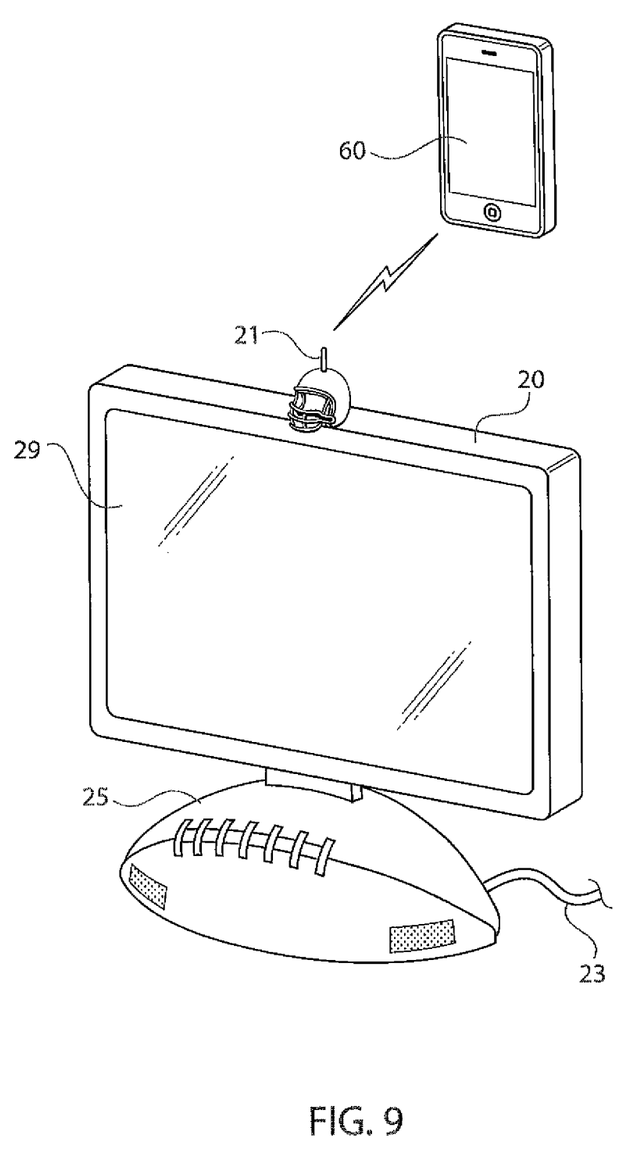
FIG. 9 shows an embodiment where a smartphone communicates wirelessly with a separate housing for broadcasting the radio.

The internet radio 40 may include a user interface 44 which interacts with the processor 42 to provide accessible controls for a user. The user interface 44 may have a series of buttons or dials 45 for making adjustments (i.e., change stations or volume) to the internet radio 40. Additionally, the user interface 44 could incorporate a connection 46 which would allow the internet radio 40 to be attached to a personal computer 47. By way of example, the housing 41 may be connected to the personal computer 47 (or smartphone 60 as shown in FIG. 9) by a USB or wireless connection. Software running on the personal computer 47 can allow greater control over the functions of the internet radio 40. For example, the software may allow the user to add additional internet radio stations to the internet radio 40 which can then be accessed by the user interface 44.

The housing 41 may also have an audio connector 48 attached to the processor 42. This audio connector 48 can be any type of interface which would enable an audio signal to be transmitted from the processor 42 to a speaker 49. For example, standard speaker wire could be employed. Additionally, the audio interface 48 may be a wireless interface (i.e., infrared transmission) which can be received by suitable apparatus in the speaker 49. The speaker 49 can be located remotely from the housing 41, or within the housing 41. Where the speaker 49 is located remotely from the housing 41, the speaker may also have an ornamental design. The speaker may also have controls to provide power and volume control (not shown).

Figure 5:
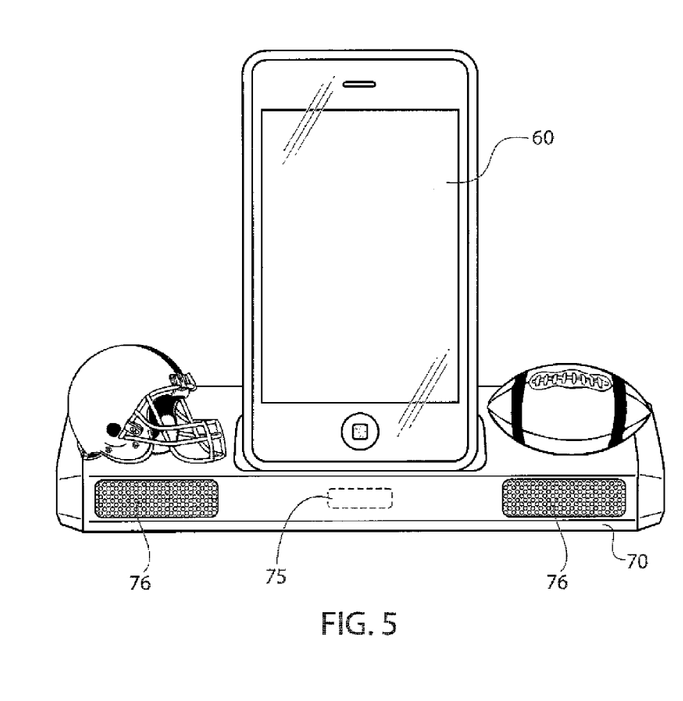
FIG. 5 shows an alternative embodiment of the invention.

FIG. 5 shows another alternative embodiment according to the invention. In this embodiment, a smartphone 60, which has a receiver for connecting to Internet radio stations, is connected to a docking station 70, which contains speakers 76, which are adapted to broadcast the signals received from smartphone 60. Ornaments 73, 74 are attached to docking station 70. Docking station 70 has a microprocessor 75 disposed within docking station 70, which causes smartphone 60 to default to an internet radio station that is correlated with ornaments 73, 74, which in this case would be a football-related station. Thus, connecting smartphone 60 to docking station 70 causes smartphone 60 to automatically connect to a football-related internet radio station, which is then broadcast through speakers 76.

Figure 6:
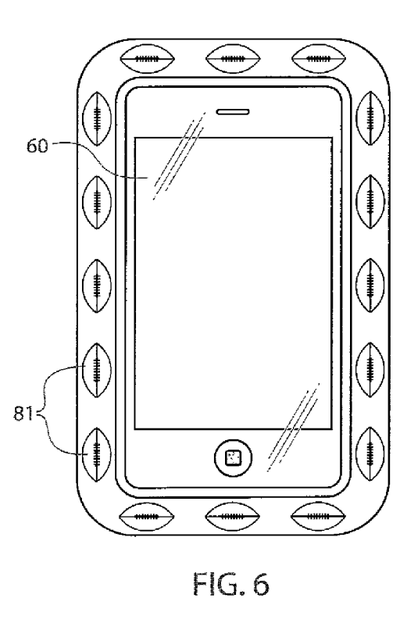
FIG. 6 shows another alternative embodiment of the invention.

In the embodiment shown in FIG. 6, smartphone 60 is connected to a cover 80, which contains themed ornaments 81. Cover 80 also contains a microprocessor 82, which connects to smartphone 60 when cover 80 is placed onto smartphone 60. Microprocessor 82 causes smartphone 60 to connect to an internet radio station related to ornaments 81, which in this case is football. Thus, connecting cover 80 to smartphone 60 automatically causes smartphone 60 to connect and broadcast a football related internet radio station. In this embodiment, the radio station is broadcast through the built-in speakers on smartphone 60.

Figure 7:
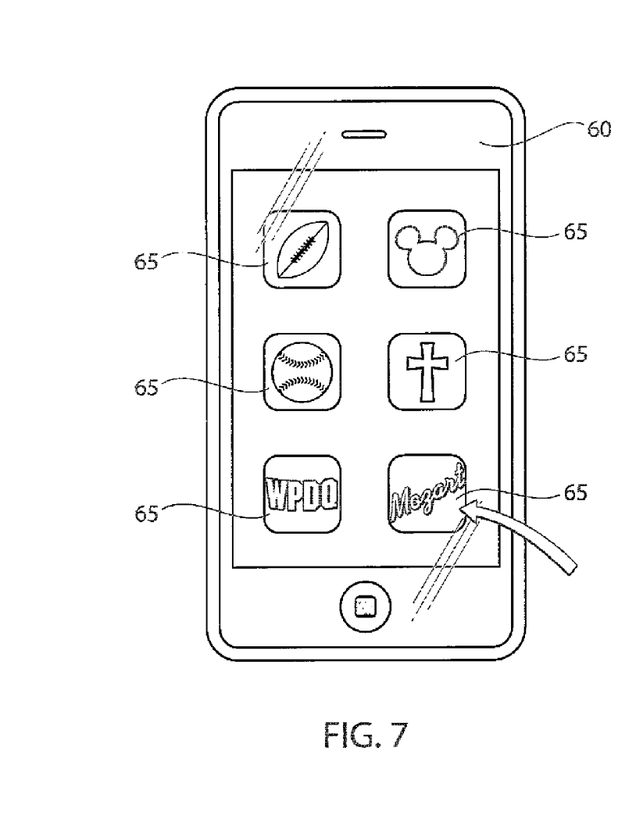
FIG. 7 shows another alternative embodiment of the invention using application programs on a smartphone.
Figure 8:
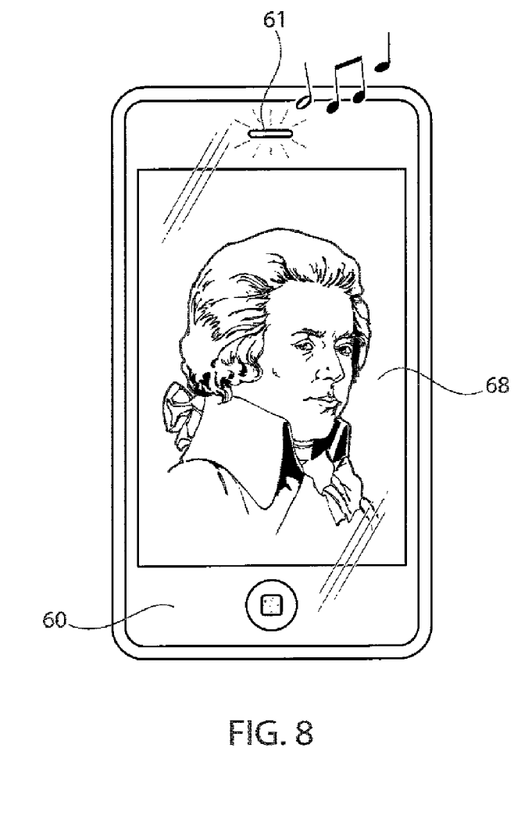
FIG. 8 shows the embodiment of FIG. 7 in use with a single application program selected.

Another embodiment is shown in FIGS. 7 and 8. In this embodiment, smartphone 60 has a series of apps 65 installed. Apps 65 all enable smartphone 60 to connect to different Internet radio stations simply by pressing one's finger on the icon of each app 65. Apps 65 can be any type of radio station, for example a sports station, a religious station, a classical music station, or a local radio station. When a user presses the icon for a selected app 65, the smartphone 60 displays a graphic 68 that is related to the selected app, which in this case is a Mozart-themed radio station. Upon selecting the app and displaying the graphic, smartphone 60 broadcasts signals from the selected radio station through the smartphone 60's internal speakers 61.

FIG. 9 shows an embodiment similar to that shown in FIG. 2, but with radio 20 having a video screen as well. Radio 20 communicates wirelessly via antenna 21 to a smartphone 60, which is programmed with one or more internet radio stations. The signals from these radio stations are sent wirelessly to radio to and are broadcast via radio 20. Screen 20 can also display video images captured from smartphone 60 and sent through the wireless signals.

The various embodiments and aspects of the invention described here can be employed individually or in conjunction with other embodiments and aspects. Descriptions of individual aspects and embodiments does not preclude the inclusion of other aspects, embodiments or additional structural components.

It is to be understood that the invention is not limited to the details of construction or process steps set forth in the following description. The invention is capable of other embodiments and of being practiced or being carried out in various ways.

While there have been shown, described and pointed out fundamental novel features of the invention as applied to preferred embodiments or aspects thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A system for playing signals received from the internet or other information highway on one or more speakers, comprising:
 a smartphone having:
  a receiver that connects to the internet or other information highway; and
  a processor in the receiver that connects to preselected addresses on the internet or other information highway;
  speakers within the smartphone for playing signals received by the receiver; and an ornamental attachment connected to the smartphone, the ornamental attachment having a design that is related to a topic of the signals received from one of the preselected addresses on the internet or other information highway, the ornamental attachment having a device that selects the preselected address related to the topic, such that connecting the smartphone to the ornamental attachment causes the smartphone to default to the preselected internet address related to the topic of the ornamental design.

2. The system according to claim 1, wherein the ornamental attachment is a cover for the smartphone.

3. The system according to claim 1, wherein there are a plurality of ornamental attachments, each ornamental attachment being related to a different topic.

* * * * *